US012619184B2

(12) United States Patent
Morita

(10) Patent No.: US 12,619,184 B2
(45) Date of Patent: May 5, 2026

(54) IMAGE FORMING APPARATUS INCLUDING CLEANING PORTION THAT PERFORMS CLEANING OF SENSING SURFACE OF SENSOR FOR OUTPUTTING SENSING VALUE RELATED TO TONER DENSITY

(71) Applicant: KYOCERA Document Solutions Inc., Osaka (JP)

(72) Inventor: Takuro Morita, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/008,960

(22) Filed: Jan. 3, 2025

(65) Prior Publication Data

US 2025/0231514 A1 Jul. 17, 2025

(30) Foreign Application Priority Data

Jan. 12, 2024 (JP) ................................ 2024-003495

(51) Int. Cl.

*G03G 15/00* (2006.01)
*B08B 1/12* (2024.01)
*B08B 1/30* (2024.01)
*G03G 21/16* (2006.01)

(52) U.S. Cl.

CPC .......... *G03G 15/5054* (2013.01); *B08B 1/12* (2024.01); *B08B 1/30* (2024.01); *G03G 15/5041* (2013.01); *G03G 21/1652* (2013.01); *G03G 2215/00042* (2013.01)

(58) Field of Classification Search

CPC ............ G03G 15/161; G03G 15/5041; G03G 15/5054; G03G 21/00; G03G 21/1652; G03G 2215/00042; G03G 2221/00; G03G 2221/0047; G03G 2221/0089; B08B 1/12; B08B 1/30

See application file for complete search history.

(56) References Cited

FOREIGN PATENT DOCUMENTS

| | | | | |
|---|---|---|---|---|
| EP | 1361482 | A2 * | 11/2003 | ......... G03G 15/0898 |
| JP | 62-127851 | A | 6/1987 | |
| JP | 2005-091912 | A | 4/2005 | |
| JP | 2007-79321 | A | 3/2007 | |
| JP | 2009-258245 | A | 11/2009 | |
| JP | 2010-128031 | A | 6/2010 | |

OTHER PUBLICATIONS

Extended European Search Report dated May 23, 2025, issued by the European Patent Office in corresponding application EP 25150976.6.

* cited by examiner

*Primary Examiner* — Sophia S Chen
(74) *Attorney, Agent, or Firm* — Stein IP, LLC

(57) ABSTRACT

An image forming apparatus includes a density sensing portion, a cleaning portion, and a control portion. The density sensing portion includes a substrate and a sensor package and outputs a sensing value related to a toner density of a toner image formed on an outer circumferential surface of an image carrier. The control portion performs control so that, when the cleaning portion performs cleaning of a sensing surface, a brush is moved to a cleaning position where the brush contacts the sensing surface. The control portion also performs control so that, when the cleaning portion does not perform the cleaning of the sensing surface, the brush is moved to a retracted position where the brush does not contact the sensor package and the substrate.

3 Claims, 6 Drawing Sheets

IMAGE FORMING APPARATUS INCLUDING CLEANING PORTION THAT PERFORMS CLEANING OF SENSING SURFACE OF SENSOR FOR OUTPUTTING SENSING VALUE RELATED TO TONER DENSITY

INCORPORATION BY REFERENCE

This application is based upon and claims the benefit of priority from the corresponding Japanese Patent Application No. 2024-003495 filed on Jan. 12, 2024, the entire contents of which are hereby incorporated by reference.

BACKGROUND

The present disclosure relates to an image forming apparatus.

In electrophotographic image forming apparatuses such as a copy machine and a printer, there is widely used a device that supplies toner to an electrostatic latent image formed on an outer circumferential surface of a photosensitive drum so as to develop the electrostatic latent image into a toner image to be transferred later to a sheet. A density of a toner image formed by such an image forming apparatus may vary with time due to various reasons. That is why calibration is generally executed in which a toner image for density correction (a reference image) is formed on an outer circumferential surface of a photosensitive drum or an intermediate transfer belt (an image carrier), and a toner density of the toner image sensed by a sensor is corrected. In order to properly perform the density correction, what is important is a cleaning process to remove foreign matter adhering to a sensing surface of the sensor.

SUMMARY

An image forming apparatus according to one aspect of the present disclosure includes a density sensing portion, a cleaning portion, and a control portion. The density sensing portion includes a sensor that applies light toward an outer circumferential surface of an image carrier and receives reflected light from the image carrier, and outputs a sensing value related to a toner density of a toner image formed on the outer circumferential surface of the image carrier. The cleaning portion includes a brush that moves in an intersecting direction intersecting with the light applied by the sensor, and performs cleaning of a sensing surface of the sensor by use of the brush. The control portion controls an operation of the cleaning portion. The density sensing portion includes a substrate and a sensor package that is secured to a surface of the substrate opposed to the image carrier so as to protrude toward the image carrier and holds the sensor. The cleaning portion includes a slide member that holds the brush, a drive part that drives the slide member to move in the intersecting direction, and the brush that is secured to the slide member so as to protrude toward the sensor and has a length long enough to contact the sensing surface and not long enough to contact the substrate. The control portion performs control so that, when the cleaning portion performs the cleaning of the sensing surface, the brush is moved to a cleaning position where the brush contacts the sensing surface, and when the cleaning portion does not perform the cleaning of the sensing surface, the brush is moved to a retracted position where the brush does not contact the sensor package and the substrate.

DETAILED DESCRIPTION

With reference to the appended drawings, the following describes an embodiment of the present disclosure. The present disclosure, however, is not limited to what is described below.

Figure 1:
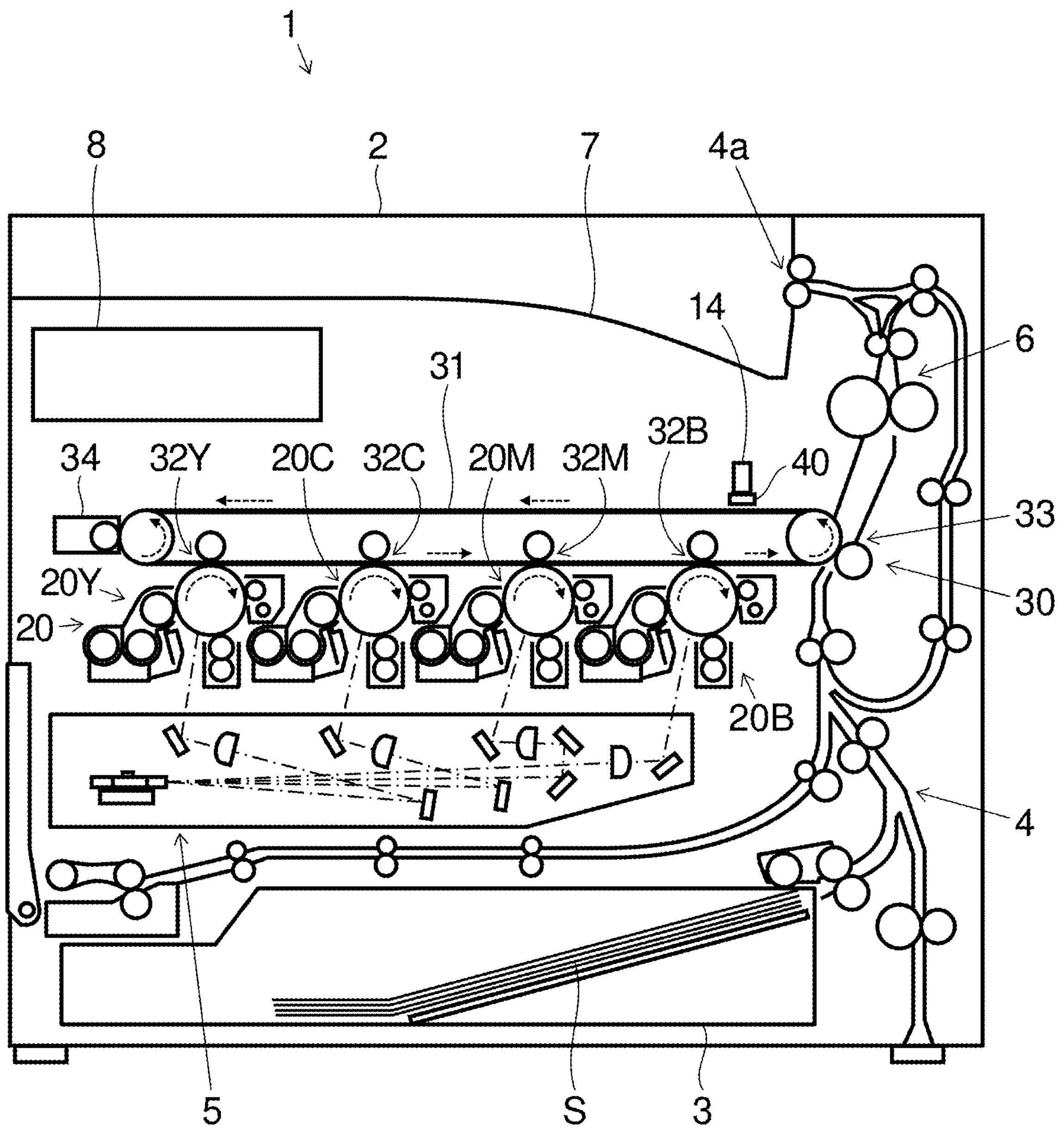
FIG. 1 is a schematic sectional front view of an image forming apparatus according to one embodiment of the present disclosure.
Figure 2:
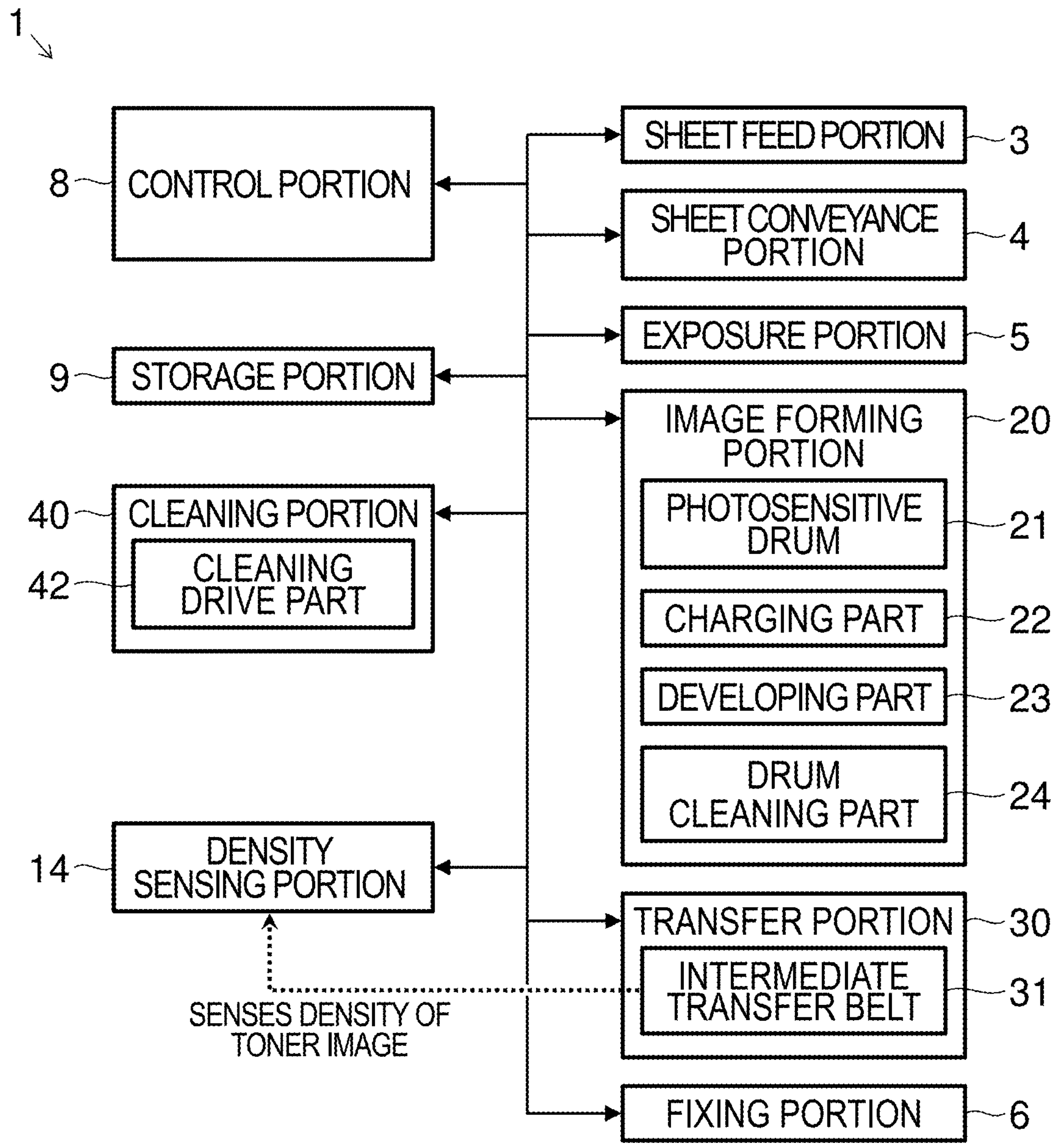
FIG. 2 is a block diagram illustrating a configuration of the image forming apparatus shown in FIG. 1.
Figure 3:
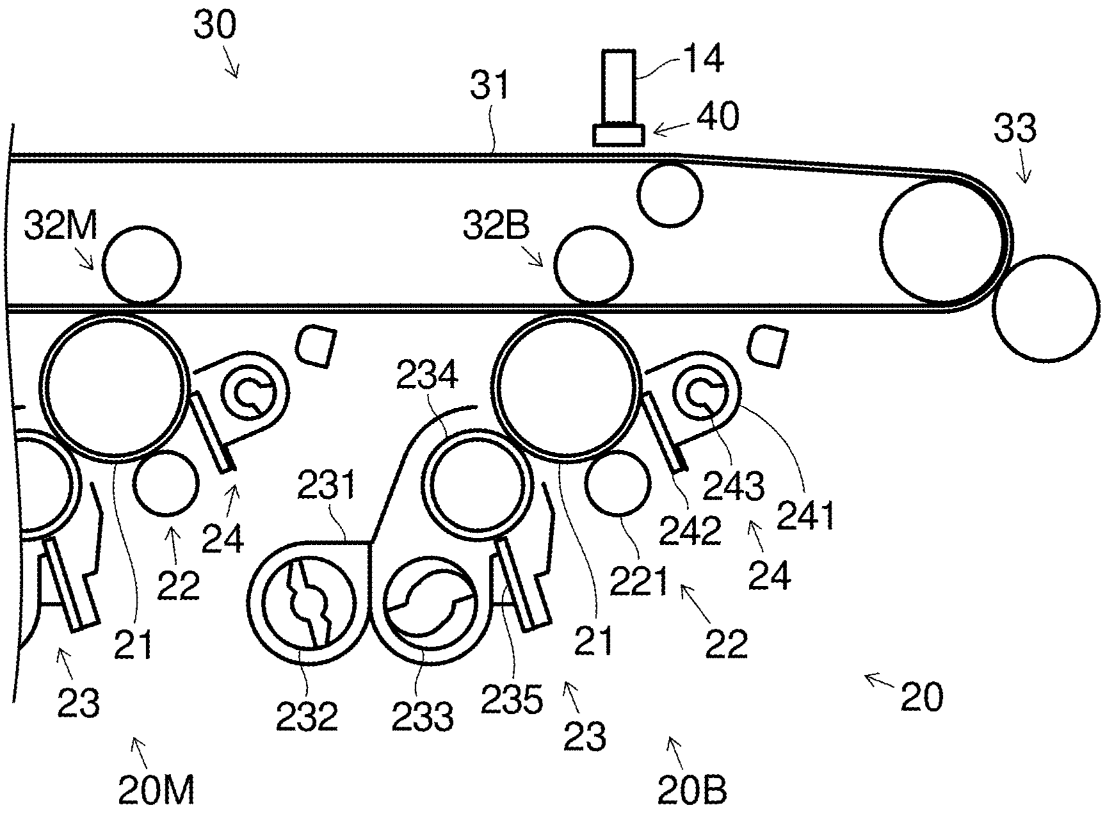
FIG. 3 is a schematic sectional front view of and around image forming portions in the image forming apparatus shown in FIG. 1.

FIG. 1 is a schematic sectional front view of an image forming apparatus 1 according to the embodiment. FIG. 2 is a block diagram illustrating a configuration of the image forming apparatus 1 shown in FIG. 1. FIG. 3 is a schematic sectional front view of and around image forming portions 20 in the image forming apparatus 1 shown in FIG. 1. One example of the image forming apparatus 1 according to this embodiment is a tandem color printer that uses an intermediate transfer belt 31 to transfer a toner image to a sheet S. The image forming apparatus 1 may be a so-called multi-functional peripheral equipped with functions such as, for example, printing, scanning (image reading), facsimile transmission, and so on.

As shown in FIGS. 1, 2, and 3, the image forming apparatus 1 includes, in a main body 2 thereof, a sheet feed portion 3, a sheet conveyance portion 4, an exposure portion 5, the image forming portions 20, a transfer portion 30, a fixing portion 6, a sheet discharge portion 7, a control portion 8, and a storage portion 9.

The sheet feed portion 3 is arranged in a bottom part of the main body 2. The sheet feed portion 3 contains a plurality of sheets S before being subjected to printing and feeds out the sheets S one by one separately during the printing. The sheet conveyance portion 4 extends in an up-down direction along a side wall of the main body 2. The sheet conveyance portion 4 conveys the sheet S fed out from the sheet feed portion 3 to a secondary transfer part 33 and to the fixing portion 6 and further discharges the sheet S that has been subjected to fixing through a sheet discharge port **4*a* to the sheet discharge portion 7. The exposure portion 5 is arranged above the sheet feed portion 3. The exposure portion 5 applies laser light controlled based on image data toward the image forming portions 20**.

The image forming portions 20 are arranged above the exposure portion 5 and below the intermediate transfer belt 31. The image forming portions 20 include an yellow image forming portion 20Y, a cyan image forming portion 20C, a magenta image forming portion 20M, and a black image forming portion 20B. These four image forming portions 20 are identical in basic configuration. Thus, in the following description, unless particularly required to be limited, identification symbols "Y," "C," "M," and "B" representing the respective colors may be omitted.

Each of the image forming portions 20 includes a photosensitive drum 21 that is supported so as to be rotatable in a prescribed direction (clockwise in FIGS. 1 and 3). Each of the image forming portions 20 further includes, around the photosensitive drum 21, a charging part 22, a developing part 23, and a drum cleaning part 24, which are arranged along a rotation direction of the photosensitive drum 21. A primary transfer part 32 is arranged between the developing part 23 and the drum cleaning part 24.

The photosensitive drum 21 includes a photosensitive layer formed on an outer circumferential surface thereof. The charging part 22 charges the outer circumferential surface of the photosensitive drum 21 to a prescribed surface potential. The exposure portion 5 exposes to light the outer circumferential surface of the photosensitive drum 21 charged by the charging part 22 so as to form, on the outer circumferential surface of the photosensitive drum 21, an electrostatic latent image of an original document image with attenuated electrostatic charge. The developing part 23 supplies toner to the electrostatic latent image on the outer circumferential surface of the photosensitive drum 21 so as to develop the electrostatic latent image into a toner image. The four image forming portions 20 form toner images of different colors. After the toner images have been primarily transferred to an outer circumferential surface of the intermediate transfer belt 31, the drum cleaning part 24 performs cleaning by removing residual toner or the like remaining on the outer circumferential surface of the photosensitive drum 21. In this way, the image forming portions 20 form images (toner images) to be transferred later to the sheet S.

The transfer portion 30 includes the intermediate transfer belt (an image carrier) 31, primary transfer parts 32Y, 32C, 32M, and 32B, the secondary transfer part 33, and a belt cleaning part 34. The intermediate transfer belt 31 is arranged above the four image forming portions 20. The intermediate transfer belt 31 is an endless intermediate transfer member that is supported so as to be rotatable in a prescribed direction (counterclockwise in FIGS. 1 and 3) and to which toner images formed in the four image forming portions 20 are primarily transferred in a sequentially superimposed manner. The four image forming portions 20 are arranged in a row from upstream toward downstream in a rotation direction of the intermediate transfer belt 31, i.e., in a so-called tandem arrangement.

The primary transfer parts 32Y, 32C, 32M, and 32B are arranged respectively above the image forming portions 20Y, 20C, 20M, and 20B of the respective colors via the intermediate transfer belt 31. The secondary transfer part 33 is arranged upstream of the fixing portion 6 in a sheet conveyance direction of the sheet conveyance portion 4 and downstream of the four image forming portions 20Y, 20C, 20M, and 20B in the rotation direction of the intermediate transfer belt 31. The belt cleaning part 34 is arranged downstream of the secondary transfer part 33 in the rotation direction of the intermediate transfer belt 31.

The primary transfer part 32 transfers a toner image formed on the outer circumferential surface of the photosensitive drum 21 to the intermediate transfer belt 31. In other words, in the primary transfer parts 32Y, 32C, 32M, and 32B of the respective colors, toner images are primarily transferred to the outer circumferential surface of the intermediate transfer belt 31. Further, as the intermediate transfer belt 31 rotates, at prescribed timing, toner images in the four image forming portions 20 are successively transferred in a superimposed manner to the intermediate transfer belt 31, and thus the toner images of the four different colors of yellow, cyan, magenta, and black are superimposed to form a color toner image on the outer circumferential surface of the intermediate transfer belt 31.

At a secondary transfer nip formed in the secondary transfer part 33, the color toner image on the outer circumferential surface of the intermediate transfer belt 31 is transferred to the sheet S synchronously fed by the sheet conveyance portion 4. The belt cleaning part 34 performs cleaning by removing adhering substances, such as residual toner, remaining on the outer circumferential surface of the intermediate transfer belt 31 after secondary transfer. In this way, the transfer portion 30 transfers (records) a toner image formed on the outer circumferential surface of the photosensitive drum 21 to the sheet S.

The fixing portion 6 is arranged above the secondary transfer part 33. The fixing portion 6 applies heat and pressure to the sheet S to which toner images have been transferred so that the toner images are fixed to the sheet S.

The sheet discharge portion 7 is arranged above the transfer portion 30. The sheet S, printing of which has been completed upon fixing of toner images thereto, is conveyed to the sheet discharge portion 7. The sheet discharge portion 7 allows a sheet after being subjected to printing (printed matter) to be taken out from above.

The control portion 8 includes a CPU, an image processing part, and other electronic circuits and electronic components (none of which are shown). Based on control programs and data stored in the storage portion 9, the CPU controls operations of the various constituent elements provided in the image forming apparatus 1 so as to perform processing related to functions of the image forming apparatus 1. The sheet feed portion 3, the sheet conveyance portion 4, the exposure portion 5, the image forming portions 20, the transfer portion 30, and the fixing portion 6 individually receive commands from the control portion 8, based on which they perform printing with respect to the sheet S in coordination with each other.

The storage portion 9 is formed of a combination of, for example, a nonvolatile storage device (not shown) such as a program ROM (read-only memory) or a data ROM and a volatile storage device (not shown) such as a RAM (random-access memory).

Next, with reference to FIG. 3, a description is given of a configuration of and around the image forming portions 20. Since the image forming portions 20 of the respective colors are identical in basic configuration, unless particularly required to be limited, for the constituent elements thereof, the identification symbols representing the respective colors and repeated descriptions are omitted.

Each of the image forming portions 20 includes the photosensitive drum 21, the charging part 22, the developing part 23, and the drum cleaning part 24.

The photosensitive drum 21 has a shape of a cylinder rotatably supported with a center axis thereof horizontal and is rotated about the center axis at a given speed by a drive part (not shown). The photosensitive drum 21 includes a photosensitive layer provided on an outer circumferential surface of a metal drum tube thereof made of, for example, aluminum, and the photosensitive layer is formed of an inorganic photosensitive member made of amorphous silicon or the like. An electrostatic latent image is formed on the outer circumferential surface of the photosensitive drum 21.

The charging part 22 includes, for example, a charging roller 221. The charging roller 221 extends parallel to an axis direction of the photosensitive drum 21 and is rotatably supported with a center axis thereof horizontal. The charging roller 221 is in contact with the outer circumferential surface of the photosensitive drum 21 and thus rotates following rotation of the photosensitive drum 21. The charging roller 221 includes a conductive layer provided on, for example, an outer circumferential surface of a metal core thereof, and the conductive layer is formed of, for example, a crosslinked rubber blended with an ionic conductive material. Applying a prescribed charging voltage to the charging roller 221 causes the outer circumferential surface of the photosensitive drum 21 to be uniformly charged.

The developing part 23 is arranged downstream of the charging part 22 in the rotation direction of the photosensitive drum 21. The developing part 23 includes a developing container 231, a first conveyance member 232, a second conveyance member 233, a developing roller (a developer carrier) 234, and a regulation member 235.

The developing container 231 has an elongated shape extending along the axis direction of the photosensitive drum 21 (a depth direction with respect to a drawing plane of FIG. 3) and is arranged with a longitudinal direction thereof horizontal. The developing container 231 contains, for example, a two-component developer including toner and a magnetic carrier as a developer including toner to be supplied to the photosensitive drum 21.

The first conveyance member 232 and the second conveyance member 233 are supported to the developing container 231 so as to be rotatable about axes thereof extending parallel to the photosensitive drum 21. The first conveyance member 232 and the second conveyance member 233 rotate about their axes so as to convey, while agitating, the developer in mutually opposite directions along axis directions of the rotations.

The developing roller 234 is positioned above the second conveyance member 233 in the developing container 231 and is arranged to be opposed to the photosensitive drum 21. The developing roller 234 is supported to the developing container 231 so as to be rotatable about an axis thereof extending parallel to the axis of the photosensitive drum 21. A part of an outer circumferential surface of the developing roller 234 is exposed from the developing container 231 so as to be opposed in proximity to the photosensitive drum 21. The developing roller 234 carries the developer including toner in the developing container 231 and supplies it to the photosensitive drum 21. In other words, the developing roller 234 causes the toner in the developing container 231 to adhere to an electrostatic latent image on the outer circumferential surface of the photosensitive drum 21, thus forming a toner image thereon.

In a rotation direction of the developing roller 234, the regulation member 235 is arranged upstream of a region in which the developing roller 234 is opposed to the photosensitive drum 21. The regulation member 235 is opposed in proximity to the developing roller 234 and is arranged with a prescribed distance provided between a distal end thereof and the outer circumferential surface of the developing roller 234. The regulation member 235 extends over an entire region of the developing roller 234 in an axis direction thereof.

The first conveyance member 232 and the second conveyance member 233 rotate to circulate and agitate the developer in the developing container 231 so that the developer is charged, and then the developer is carried on the outer circumferential surface of the developing roller 234. The regulation member 235 regulates a thickness of the developer carried on the outer circumferential surface of the developing roller 234. When a prescribed developing voltage is applied to the developing roller 234, due to a potential difference between a potential of the developing voltage and a surface potential of the outer circumferential surface of the photosensitive drum 21, in the region in which the developing roller 234 is opposed to the photosensitive drum 21, the toner in the developer carried on the outer circumferential surface of the developing roller 234 moves to the outer circumferential surface of the photosensitive drum 21. Thus, an electrostatic latent image on the outer circumferential surface of the photosensitive drum 21 is developed with the toner.

The drum cleaning part 24 is arranged downstream of the primary transfer part 32 in the rotation direction of the photosensitive drum 21. The drum cleaning part 24 includes a collection container 241, a cleaning blade 242, and a collection spiral 243.

The collection container 241 has an elongated shape extending along the axis direction of the photosensitive drum 21 (the depth direction with respect to the drawing plane of FIG. 3) and is arranged with a longitudinal direction thereof horizontal. The collection container 241 is to contain residues such as residual toner removed from the outer circumferential surface of the photosensitive drum 21 by the cleaning blade 242.

The cleaning blade 242 has a shape of a plate extending along the axis direction of the photosensitive drum 21 and is formed of an elastic member of, for example, a polyurethane rubber or the like. The cleaning blade 242 is arranged downstream of a point of contact with the photosensitive drum 21 in the drum rotation direction so as to form, at the point of contact, a prescribed angle with respect to a tangent direction of the photosensitive drum 21. Under a prescribed pressure, the cleaning blade 242 contacts the outer circumferential surface of the photosensitive drum 21. The cleaning blade 242 removes residues including residual toner remaining on the outer circumferential surface of the photosensitive drum 21 after primary transfer.

In a lower part in the collection container 241, the collection spiral 243 is arranged in a region distant from the photosensitive drum 21 across the cleaning blade 242. The collection spiral 243 is supported to the collection container 241 so as to be rotatable about an axis thereof extending parallel to a rotation axis of the photosensitive drum 21. The collection spiral 243 has, for example, a spiral conveyance blade extending in an axis direction thereof. The collection spiral 243 conveys residues such as residual toner removed from the outer circumferential surface of the photosensitive drum 21 to a collected waste disposal container (not shown) provided outside the drum cleaning part 24.

The image forming apparatus 1 further includes a density sensing portion 14 and a cleaning portion 40. The density sensing portion 14 and the cleaning portion 40 are arranged downstream of the secondary transfer part 33 in the rotation direction of the intermediate transfer belt 31 and above and apart from the intermediate transfer belt 31. The density sensing portion 14 is opposed to the outer circumferential surface of the intermediate transfer belt 31 in the up-down direction. The cleaning portion 40 is arranged below the density sensing portion 14 and between the density sensing portion 14 and the intermediate transfer belt 31.

Figure 4:
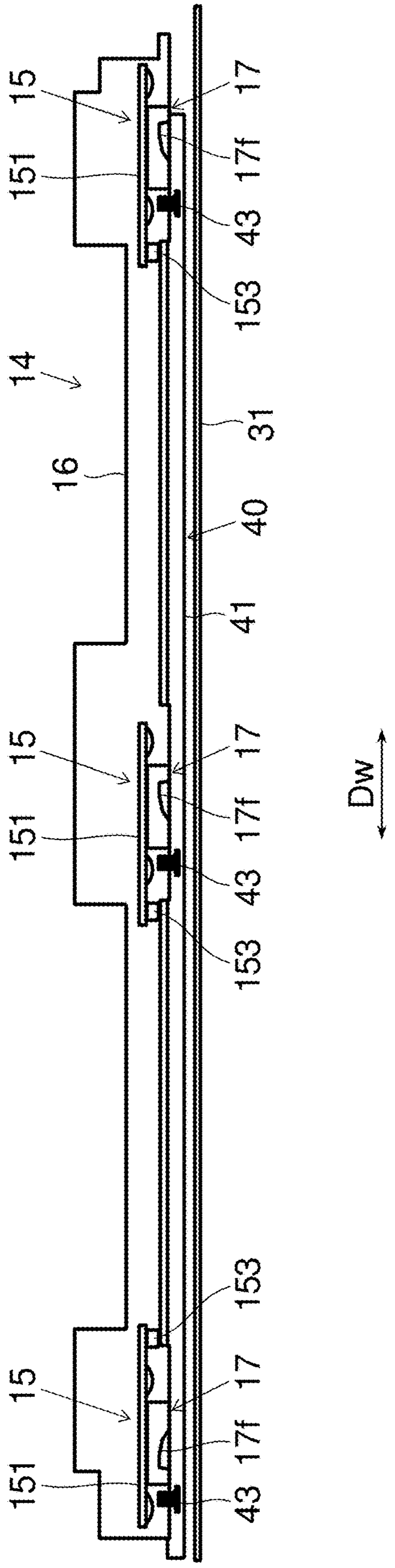
FIG. 4 is a schematic sectional side view of and around a density sensing portion shown in FIG. 3.
Figure 5:
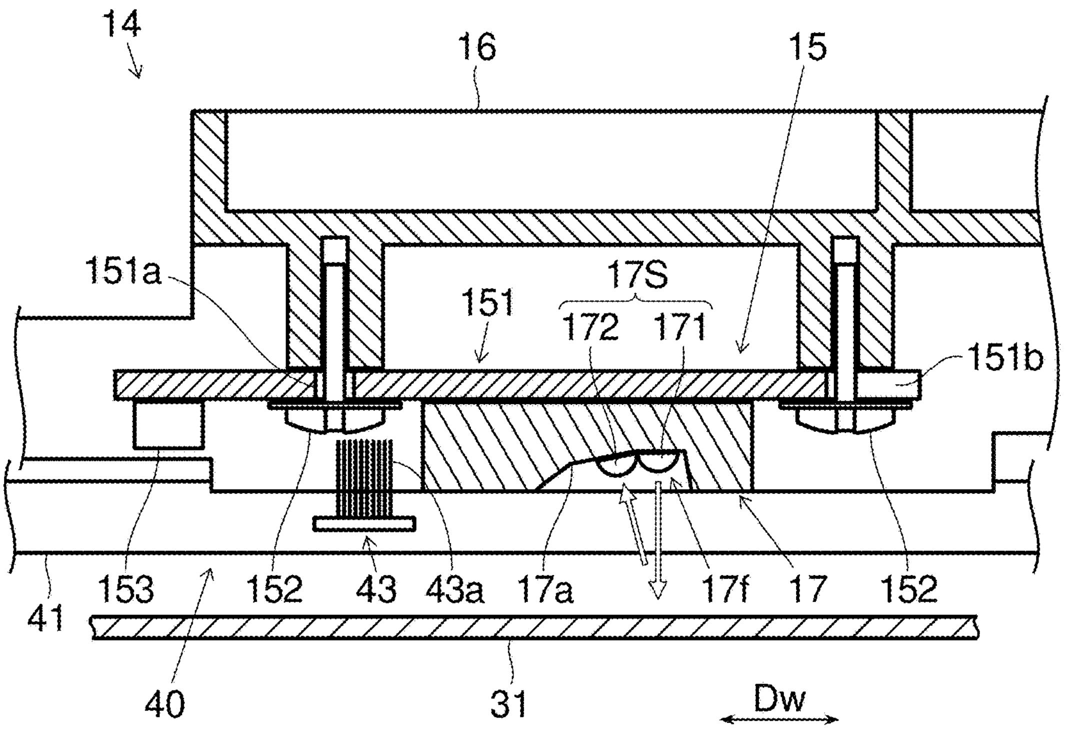
FIG. 5 is a partially enlarged sectional side view of the density sensing portion shown in FIG. 4.
Figure 6:
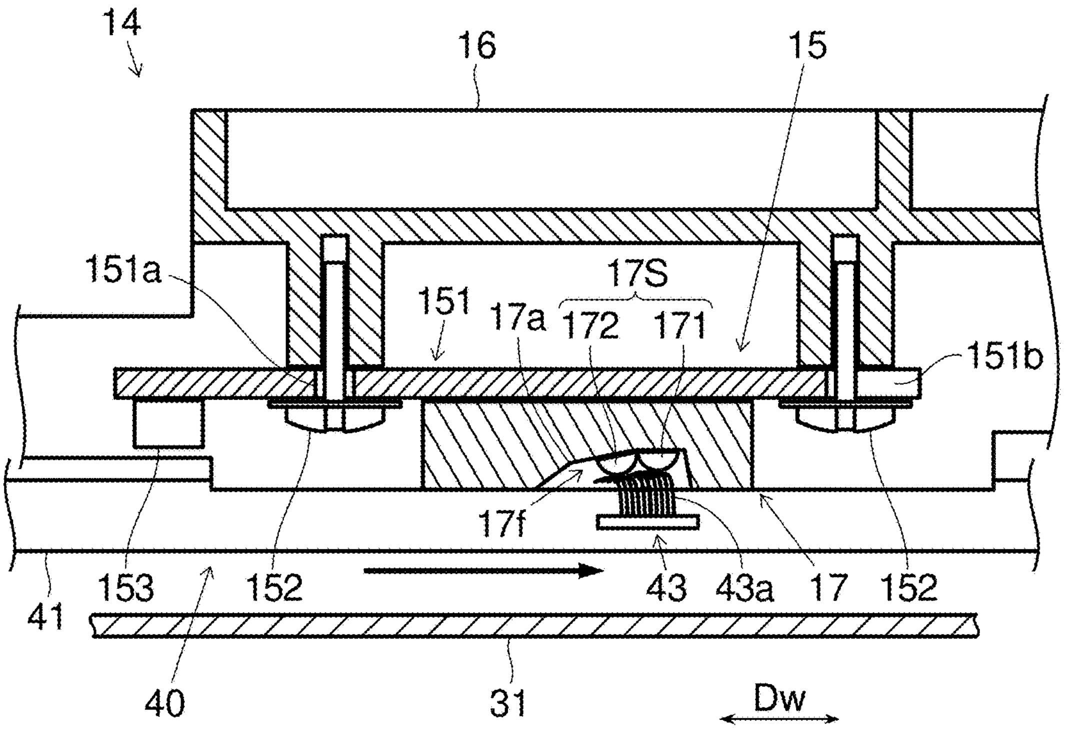
FIG. 6 is a partially enlarged sectional side view of a sensor part of the density sensing portion shown in FIG. 4, illustrating a state where a brush of a cleaning portion has been moved to a cleaning position.
Figure 7:
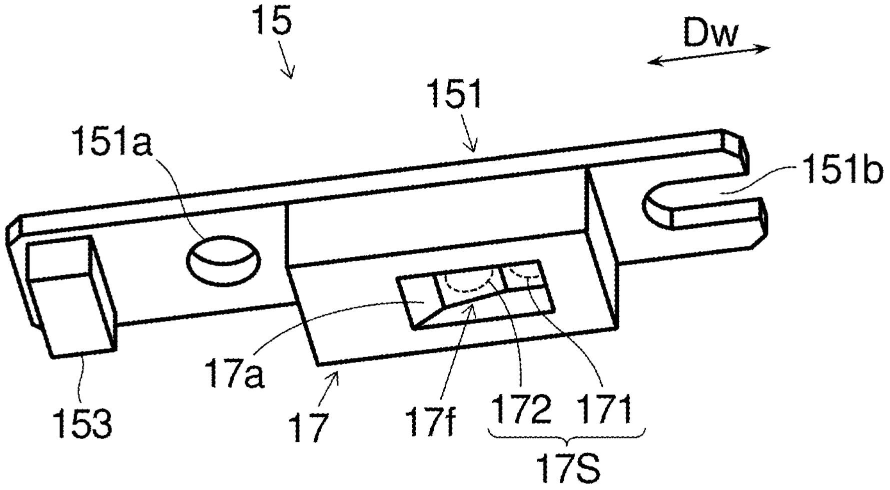
FIG. 7 is a perspective view of the sensor part of the density sensing portion shown in FIG. 4.

FIG. 4 is a schematic sectional side view of and around the density sensing portion 14 shown in FIG. 3. FIG. 5 is a partially enlarged sectional side view of a sensor part 15 of the density sensing portion 14 shown in FIG. 4. FIG. 6 is a partially enlarged sectional side view of the sensor part 15 of the density sensing portion 14 shown in FIG. 4, illustrating a state where a brush 43 of the cleaning portion 40 has been moved to a cleaning position. FIG. 7 is a perspective view of the sensor part 15 of the density sensing portion 14 shown in FIG. 4. In each of these drawings, an arrow representing a sheet width direction Dw orthogonal to the sheet conveyance direction is depicted where appropriate.

The density sensing portion 14 includes the sensor part 15 and a holder 16.

The sensor part 15 is arranged at each of three side-by-side locations in the sheet width direction Dw (a left-right transverse direction in FIG. 4) orthogonal to the sheet conveyance direction. To be more specific, the sensor part 15 is arranged at each of three locations that are a center and both ends of the density sensing portion 14 in the sheet width direction Dw. That is, the density sensing portion 14 senses, at the three locations at the center and both the ends thereof in the sheet width direction Dw, a toner density of a toner image formed on the outer circumferential surface of the intermediate transfer belt 31. The holder 16 extends in the sheet width direction Dw and holds three sensor parts 15.

The sensor part 15 includes a substrate 151, a screw (a securing member) 152, a connector 153, and a sensor package 17.

The substrate 151 is a plate-shaped member extending in the sheet width direction Dw and is secured to the holder 16 by use of two screws 152. The substrate 151 has holes 151*a* into which the screws 152 are inserted and a recess 151*b*. The screws 152 are arranged at two side-by-side locations apart from each other in the sheet width direction Dw and are inserted upward from below into the holder 16 so as to secure the substrate 151. The substrate 151 holds the connector 153 and the sensor package 17.

The connector 153 is secured at one end of the substrate 151 in the sheet width direction Dw and to a lower surface of the substrate 151 (a surface thereof opposed to the intermediate transfer belt 31). The connector 153 is arranged at a distance from the sensor package 17. The connector 153 is electrically connected to an after-mentioned sensor 17S in the sensor package 17. Via the connector 153, the sensor part 15 externally supplies electric power to the sensor 17S and externally outputs a sensing value of the sensor 17S.

The sensor package 17 is arranged at substantially a center of the substrate 151 in the sheet width direction Dw and between the two screws 152. The sensor package 17 is secured to the lower surface of the substrate 151 (the surface thereof opposed to the intermediate transfer belt 31) and protrudes downward toward the intermediate transfer belt 31. The sensor package 17 has an upwardly recessed concavity 17*a* that is arranged at such a position as to be opposed to the intermediate transfer belt 31 below it. The sensor package 17 holds the sensor 17S inside the concavity 17*a*. A sensing surface 17*f* of the sensor 17S is positioned inside the concavity 17*a*.

The sensor package 17 is provided with the sensor 17S, which is a reflective optical sensor having a light-emitting part 171 including a light-emitting element such as, for example, an LED (light-emitting diode) and a light-receiving part 172 including a light-receiving element such as, for example, a photodiode. The light-emitting part 171 applies, at a prescribed angle, sensing light toward a toner image primarily transferred to the outer circumferential surface of the intermediate transfer belt 31. The light-receiving part 172 receives the sensing light (reflected light) applied by the light-emitting part 171 toward the toner image and reflected from the toner image.

As a method for sensing a toner density of a toner image, there are used two types of methods, i.e., a method in which regularly reflected sensing light is received and a method in which diffusely reflected sensing light is received. In this embodiment, the description is directed to the sensing method in which regularly reflected sensing light is received.

The sensor package 17 outputs a level of sensing light received in the light-receiving part 172 as a sensing value (a voltage value) related to a toner density so as to derive therefrom an amount of toner of a toner image primarily transferred to the outer circumferential surface of the intermediate transfer belt 31 and thus can sense a toner density of the toner image. In a case where there is no toner on the outer circumferential surface of the intermediate transfer belt 31, sensing light applied from the light-emitting part 171 is not diffusely reflected by toner but is regularly reflected, so that a larger part thereof enters the light-receiving part 172. Thus, there is obtained a higher sensing value (voltage value) related to a toner density. Further, the larger an amount of toner on the outer circumferential surface of the intermediate transfer belt 31, the larger an amount of light diffusely reflected by the toner, and an amount of light entering the light-receiving part 172 is gradually decreased. That is, the sensing value (the voltage value) related to the toner density is gradually decreased.

In this way, the density sensing portion 14 applies sensing light from the light-emitting part 171 toward a toner image and senses, based on the sensing light reflected from the toner image and received in the light-receiving part 172, a toner density of the toner image, which has been transferred to the outer circumferential surface of the intermediate transfer belt 31. In other words, the density sensing portion 14 outputs a sensing value related to a toner density of toner images formed on the outer circumferential surfaces of the photosensitive drums 21 in the image forming portions 20 and thus senses the toner density.

The cleaning portion 40 includes a slide member 41, a cleaning drive part 42, and a brush 43.

The slide member 41 is a plate-shaped member extending in the sheet width direction Dw and is supported by a guide part (not shown) movably in the sheet width direction Dw. By the cleaning drive part 42, the slide member 41 is driven to reciprocate in the sheet width direction Dw. The slide member 41 holds the brush 43.

The cleaning drive part 42 drives the slide member 41 to move in the sheet width direction Dw. In other words, the cleaning drive part 42 drives the slide member 41 to move in an intersecting direction intersecting with light applied by the sensor 17S. An operation of the cleaning drive part 42 is controlled by the control portion 8. The cleaning drive part 42 includes, for example, the guide part, a power transmission part, and a drive motor (none of which are shown).

The guide part extends in the sheet width direction Dw and supports the slide member 41. The slide member 41 is reciprocatable in an extending direction of the guide part, namely, the sheet width direction Dw. The power transmission part is formed of, for example, a rack-and-pinion mechanism. That is, a pinion meshing with a rack formed on the slide member 41 is driven to rotate by the drive motor, and thus the slide member 41 moves in the sheet width direction Dw along the guide part. In this way, the cleaning drive part 42 can drive the slide member 41 to reciprocate along the sheet width direction Dw. The power transmission part may be formed of any other mechanism such as a belt mechanism composed of a pair of pulleys and a belt wound around the pair of pulleys.

There are provided three brushes 43, i.e., the same number of brushes 43 as the number of the sensor parts 15. That is, the brush 43 is arranged at each of three locations that are the center and both the ends of the density sensing portion 14 in the sheet width direction Dw so as to correspond to how the sensor parts 15 are arranged. The three brushes 43 are secured to the slide member 41. The brush 43 moves as the slide member 41 reciprocates along the sheet width direction Dw. That is, the brush 43 moves in the intersecting direction intersecting with light applied by the sensor 17S.

A bristle material 43*a* of the brush 43 protrudes upward toward the sensor 17S of the sensor package 17. When, as shown in FIG. 6, the brush 43 is arranged at such a position as to be opposed to the sensor 17S, the bristle material 43*a* of the brush 43 is long enough to contact the sensing surface 17*f*. When, as shown in FIG. 5, the brush 43 is arranged at a position distant from the sensor package 17, the bristle material 43*a* of the brush 43 is not long enough to contact the substrate 151. The cleaning portion 40 performs cleaning of the sensing surface 17*f* by use of the brush 43.

Further, the control portion 8 performs control so that, when the cleaning portion 40 performs cleaning of the sensing surface 17*f*, as shown in FIG. 6, the brush 43 is moved to the cleaning position where the brush 43 contacts the sensing surface 17*f*. Furthermore, when the cleaning portion 40 does not perform the cleaning of the sensing surface 17*f*, as shown in FIG. 5, the brush 43 is moved to a retracted position where the brush 43 does not contact the sensor package 17 and the substrate 151.

According to the above-described configuration, when the cleaning portion 40 does not perform the cleaning of the sensing surface 17*f*, the brush 43 does not contact the sensor package 17 and the substrate 151 in the density sensing portion 14. This makes it possible to maintain the bristle material 43*a* of the brush 43 straight and thus to achieve a favorable property of cleaning the sensing surface 17*f* by use of the brush 43. Accordingly, proper density correction is enabled in the image forming apparatus 1.

Furthermore, the retracted position of the brush 43 is arranged laterally adjacently to the sensor package 17. To be more specific, the retracted position of the brush 43 is a position immediately lateral to the sensor package 17 in the sheet width direction Dw, where the brush 43 does not contact the sensor package 17 and is opposed to the substrate 151 in the up-down direction.

While in an example shown in FIG. 5, the retracted position of the brush 43 lies on a side near the connector 153 relative to the sensor package 17, the retracted position of the brush 43 may lie on an opposite side to the side near the connector 153. FIG. 4 shows a state where the brushes 43 are each arranged at the retracted position. In a left one of the sensor parts 15 shown in FIG. 4, the retracted position of the brush 43 is arranged on the opposite side to the side near the connector 153.

According to the above-described configuration, it is possible to reduce a moving distance of the brush 43 between the cleaning position and the retracted position. In other words, it is possible to reduce a moving distance of the slide member 41 related to cleaning by use of the brush 43 and thus to reduce an amount of time required for movement thereof. This makes it possible to achieve miniaturization and noise reduction of the image forming apparatus 1.

Furthermore, the screw 152 as the securing member used to secure the substrate 151 is arranged at the retracted position of the brush 43 so as not to contact the brush 43. To be more specific, the screw 152 is arranged at each of two locations immediately lateral to the sensor package 17 near one and the other ends of the sensor package 17 in the sheet width direction Dw, where the screw 152 does not contact the sensor package 17.

According to the above-described configuration, the screw 152 is arranged at the retracted position of the brush 43, and thus it is possible to reduce a size of the substrate 151. This makes it possible to reduce a region occupied by the sensor part 15 installed therein and thus to achieve miniaturization of the density sensing portion 14. That is, it is possible to achieve miniaturization of the image forming apparatus 1.

Furthermore, the connector 153 is secured to the lower surface of the substrate 151 (the surface thereof opposed to the intermediate transfer belt 31) and protrudes downward toward the intermediate transfer belt 31. Further, the retracted position of the brush 43 is arranged between the sensor package 17 and the connector 153 in the sheet width direction Dw.

According to the above-described configuration, when the brush 43 is arranged at the retracted position, the brush 43 can be prevented from contacting the connector 153. This makes it possible to suppress a phenomenon in which the bristle material 43*a* of the brush 43 is bent as a result of contacting the connector 153 and thus to maintain the bristle material 43*a* of the brush 43 straight.

While the foregoing has described the embodiment of the present disclosure, the present disclosure is not limited in scope thereto and can be implemented in variously modified forms without departing from the spirit of the disclosure.

For example, while the foregoing embodiment uses, as the image forming apparatus 1, a color printing image forming apparatus of a so-called tandem type that performs image formation by sequentially superimposing images of a plurality of different colors on each other, there is no limitation to such a type of image forming apparatus. There may also be used color printing image forming apparatuses of any other types than the tandem type and monochrome printing image forming apparatuses.

What is claimed is:

1. An image forming apparatus, comprising:

a density sensing portion including a sensor that applies light toward an outer circumferential surface of an image carrier and receives reflected light from the image carrier, the density sensing portion outputting a sensing value related to a toner density of a toner image formed on the outer circumferential surface of the image carrier;

a cleaning portion including a brush that moves in an intersecting direction intersecting with the light applied by the sensor, the cleaning portion performing cleaning of a sensing surface of the sensor by use of the brush; and a control portion that controls an operation of the cleaning portion, wherein the density sensing portion includes:

a substrate; and a sensor package that is secured to a surface of the substrate opposed to the image carrier so as to protrude toward the image carrier and holds the sensor, the cleaning portion includes:

a slide member that holds the brush;

a cleaning drive part that drives the slide member to move in the intersecting direction; and the brush that is secured to the slide member so as to protrude toward the sensor and has a length long enough to contact the sensing surface and not long enough to contact the substrate, the control portion performs control so that, when the cleaning portion performs the cleaning of the sensing surface, the brush is moved to a cleaning position where the brush contacts the sensing surface, and when the cleaning portion does not perform the cleaning of the sensing surface, the brush is moved to a retracted position where the brush does not contact the sensor package and the substrate, the density sensing portion includes a connector that is secured to the surface of the substrate opposed to the image carrier at a distance from the sensor package and is electrically connected to the sensor, and the retracted position of the brush is arranged between the sensor package and the connector.

2. The image forming apparatus according to claim 1, wherein the retracted position of the brush is arranged laterally adjacently to the sensor package.

3. The image forming apparatus according to claim 1, wherein the density sensing portion includes a securing member for securing the substrate, and the securing member is arranged at the retracted position of the brush so as not to contact the brush.

* * * * *